US006774911B2

(12) United States Patent
Hodgson et al.

(10) Patent No.: US 6,774,911 B2
(45) Date of Patent: Aug. 10, 2004

(54) METHOD AND APPARATUS FOR VISUAL SYNCHRONIZATIONS BETWEEN GRAPHICAL REPRESENTATIONS OF AN ORGANIZATION

(75) Inventors: Simon Hodgson, York (GB); Richard Whittington, York (GB)

(73) Assignee: Mood International Limited, York (GB)

( * ) Notice: Subject to any disclaimer, the term of this patent is extended or adjusted under 35 U.S.C. 154(b) by 167 days.

(21) Appl. No.: 10/201,744

(22) Filed: Jul. 23, 2002

(65) Prior Publication Data

US 2003/0020730 A1 Jan. 30, 2003

(51) Int. Cl.[7] .................................................. G09G 5/00
(52) U.S. Cl. ..................... 345/619; 345/645; 345/764; 345/853; 345/854
(58) Field of Search ................................ 345/619, 645, 345/764, 853, 854, 855, 738

(56) References Cited

U.S. PATENT DOCUMENTS

| 6,028,602 A | * | 2/2000 | Weidenfeller et al. ...... 345/781 |
| 2001/0042063 A1 | * | 11/2001 | Ebert .......................... 345/854 |
| 2002/0089550 A1 | * | 7/2002 | Orbanes et al. ............. 345/853 |

* cited by examiner

Primary Examiner—Matthew Luu
(74) Attorney, Agent, or Firm—Head, Johnson & Kachigian (57) ABSTRACT

The invention relates to the provision of graphical representations of an organization, said displays generated on a display screen and representing the organization or portions thereof in terms of a graphical; model and a hierarchical structure. The invention allows synchronization of the two types of display, with both being regenerated to mirror and indicate changes made to the same in response to an alteration, typically following a user selection, made to the other of the displays.

10 Claims, 6 Drawing Sheets

Figure 1

Prior Art

*Selecting a capability within the visual representation automatically causes that component to be highlighted in the corresponding hierarchic structure*

Figure 5

METHOD AND APPARATUS FOR VISUAL SYNCHRONIZATIONS BETWEEN GRAPHICAL REPRESENTATIONS OF AN ORGANIZATION

CROSS-REFERENCE TO RELATED APPLICATION

This is an United States Application entitled "A Method and Apparatus For Visual Synchronization Between Graphical Representations of An Organization" claiming priority to British Application No. 0118491.0 filed 28 Jul. 2001.

BACKGROUND OF THE INVENTION

This invention which is the subject of this application relates to a method and apparatus, typically PC based, to express in a dynamic and visual fashion to a user via a display screen, the synchronization between alternative displays representing an organization or part thereof.

In one embodiment, although not exclusively, one of the displays or representations of the organization is a structured hierarchy, and the other display or representation is a graphical organization model representation. The method and apparatus give a simple, direct and powerful mechanism for establishing and communicating context relating to the design, communication or exploration of an organization to a user of the method and associated apparatus. Typically a display screen such as a PC monitor is connected to data processing means which generates the data into the display.

Figure 1:
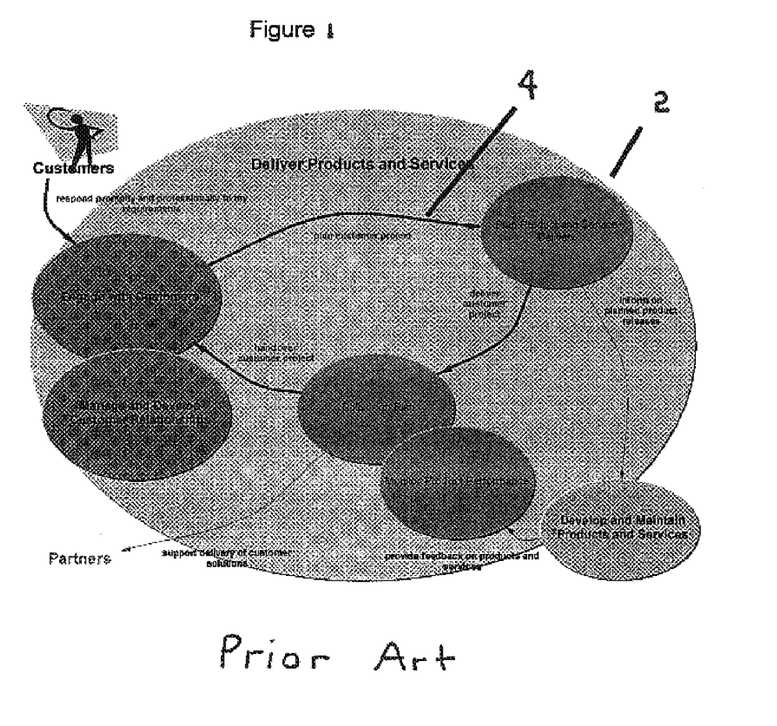
FIG. 1 illustrates a prior art example of a graphical representation of a model of part of an organization using capability components.

In recent years, organizations in many industries have recognized the benefits to be gained from the construction and communication of graphical visualizations of models of their structures and operations and one example of a conventional graphical model display is shown in FIG. 1. The benefits of graphical visualizations of organic models include improvements in the areas of change and performance management, and quality implementation. The model typically displays an organization group, also known as a "parent" comprising a number of components including "capabilities" which can be performed within the model and "linkages" which indicate the connection and dependencies between the capabilities which are required for the organization which is the subject of the model to function.

However, many organizational needs are not currently met by the graphical model of an organization. These needs can include a need for the user to be able to understand the location of an organization capability within a broader organizational graph in terms of its superior and subordinate capabilities. There is also a need for the user to be able to maintain the context of components within an organizational model in terms of the respective position of that component in a structured hierarchic view of the organization. While it is known to generate a hierarchical structure display, the user has no means of linking and interpreting the memory or relevance of that display with the graphical display of the organizational model.

Recent advances in the fields of document and knowledge management have resulted in various notations and mechanisms for improving organizational effectiveness. Patents arising from such advances have so far focused on operational data and linkages (see for example patents DE19729911 "Documentation data organisation system" and EP1065615 "Integrated management application") by which actual documents, schedules and so on can be grouped and connected.

The benefits of visual organizational modelling have also been realized in the context of computer system design, where patents exist for software generation directly via such models (e.g. U.S. Pat. No. 6,011,987 "Method and computer system for generating process management computer programs from process models").

The visual models created by such approaches lack the complexity and interactivity that is required by the user in practical usage and so are not able to satisfy the business requirements indicated above. In particular, the models exist purely to define logical structures of process, without any notion of broader organizational context or potential linkages.

A component approach to software construction has yielded valuable improvement in development and management of system. Innovations originating from that work are various; see, for example EP0883057 "Method and apparatus for software component analysis" and WO0122331 "Method for defining an executable business model".

Related to this approach is the notion of autonomous intelligent software agents, which have been widely reported in recent years. A number of patent applications have emerged (e.g. WO0102952 "Improved software Interface Agent"). This asserts a components approach to software construction whereby components are able to perform "intelligently" through deployment of sophisticated analysis techniques including "learning".

Graphical approaches to business development and transformation increasingly play a significant part in business change programs. In a previous invention (British Patent Application No. 0112277.9 "Flexible and direct navigation"), a navigation mechanism is described.

SUMMARY OF THE INVENTION

The aim of the present invention is to provide a method and apparatus to deploy and utilize a graphical representation of an organization which can be expressed in terms of capabilities and their interactions and to support the analysis, design, implementation and management of the same. By providing this apparatus and method the invention improves prior art systems by enabling the exploration and design of an organization prior to the delivery of operational document systems.

In a first aspect of the invention there is provided a method for creating and allowing user interaction with at least one graphical representation of an organisation; said method comprising the following steps:
  constructing a collection of graphical representations of the organization;
  creating a model describing at least one part of the organization by selecting capabilities of the organization which are required for the said model;
  establishing directed linkages between the selected capabilities to indicate required interactions between the capabilities;
  displaying the model in a graphical manner;
  constructing a hierarchical structure of organization capabilities to illustrate the component structure of the organization
  setting at least some of the capabilities in the context of their superior and subordinate capabilities;
  displaying the hierarchical structure in a graphical manner; and characterized in that the capabilities included within the said model display are matched and positioned relative to the other capabilities in the model with reference to the hierarchical structure display.

In one embodiment the capabilities within the model are consistent with the hierarchy display in that for each capability in the model which is defined as a superior capability in the hierarchical structure all of the required defined subordinate capabilities are included within the model display.

Typically the method includes the further step of enabling reorganization of the hierarchical structure by allowing user re-location of a component and its subordinates against a different parent or group in the structure.

The reorganization typically involves the component that has been moved being removed from the model of its previous parent, and inserted, preferably automatically, into the model describing its new parent or group.

Typically, concurrent with such a reorganization, a link is generated to indicate all of those graphical representations which can be generated to represent the organization which are affected by the reorganization and all of the identified graphical representations are amended likewise, so as to retain consistency between the graphical representations.

A further step provided in the method is the contextual analysis of a component selected by the user from the graphical model, said analysis performed by the display of a representation of the hierarchical structure of the organization so as to indicate the selected component and the position of the same in the hierarchical representation.

In a further embodiment the contextual graphical analysis of the impact can be achieved within the hierarchical display by highlighting any of the components selected by the user from within the hierarchic structure display.

Typically, contextual synchronization is achieved between the graphical representation of a selected component and its hierarchical location by means of a mechanism that causes, preferably automatically, the hierarchical display to be re-generated to indicate to the user the position of the selected component within the display, following the selection of the component from the model display.

Typically, contextual synchronization is achieved between the selected component within the hierarchical representation and its participation within the model display by means of a mechanism that, preferably automatically, causes the model to indicate the component, typically by highlighting.

In one embodiment the component indicating mechanism referred to, can be switched on and off according to user requirements.

In one embodiment the components correspond to capabilities that the organization is able to perform, either by human, system or mixed behavior and/or linkages between the capabilities.

In a second aspect of the invention there is provided apparatus for navigation through graphical representations of a model of at least part of an organisation and the hierarchical structure of said organisation; said apparatus comprising a processing means for displaying both the hierarchical structure and model of the organisation on a display screen connected to processing means, said representations each including details representing organisation parents or groups, components of the organisation and elements of the components, processing means allowing the user selection to display on a display screen either or both of the hierarchical structure or organisational model displays and to select from said displays any or any combination of a parent, component or element and characterised in that a mechanism is provided which, upon selection of a component by the user from one of the organisational model or hierarchic structure displays, allows the generation of a display of the other of the organisational model or hierarchical representation with the user selected component indicated on the same.

Typically the selected component is visually indicated. In one embodiment the indication is achieved by highlighting the component on the display screen.

The present invention therefore provides a method and apparatus for visual synchronization between graphical and hierarchical representations of an organization which allows the need to be able to view a visual representation of an organizational component, in the context of its interactions with other components to be achieved and the need to be able to perform all of these actions in a graphical environment at any level within an organization, in a direct manner to be achieved. By direct it is meant that a user of the invention can immediately access any of the above needs with a single simple, intuitive action.

DESCRIPTION OF THE DRAWINGS

Specific embodiments of the invention are now described with reference to the accompanying drawings wherein.

DESCRIPTION OF THE PREFERRED EMBODIMENTS

Referring firstly to FIG. 1 there is shown a conventional graphical display of a model of an organization of the type which can be generated on a display screen and which includes a series of components in the form of capabilities 2 indicated in the ovals and linkages 4 between the capabilities within the organization model.

The FIGS. 2–5 illustrate examples of an embodiment of the invention and show a series of graphical displays which are generated on a display screen in accordance with one embodiment of the invention implemented as a collection of graphical structuring and diagraming facilities, together with a mechanism which allows linkage between the graphical displays of the model and the hierarchical representations of an organization and utilizing a user interface such as a keyboard or computer mouse which allows the user to select a component, identify elements relating to that component and so forth.

In accordance with this embodiment two representations of an organization are created and available to the user. The first is the representation of the organization model 10 shown in FIG. 2 and where components, some of which are "capabilities" 12 and linkages or inter-relations 14 between the same are described symbolically. Using an elaboration mechanism, it is possible to navigate from a capability to its further components. It is possible for any capability 12 to be re-used in many graphical models of different aspects of the organization such that there are typically a plurality of selectable graphical models for any one organization.

Figure 2:
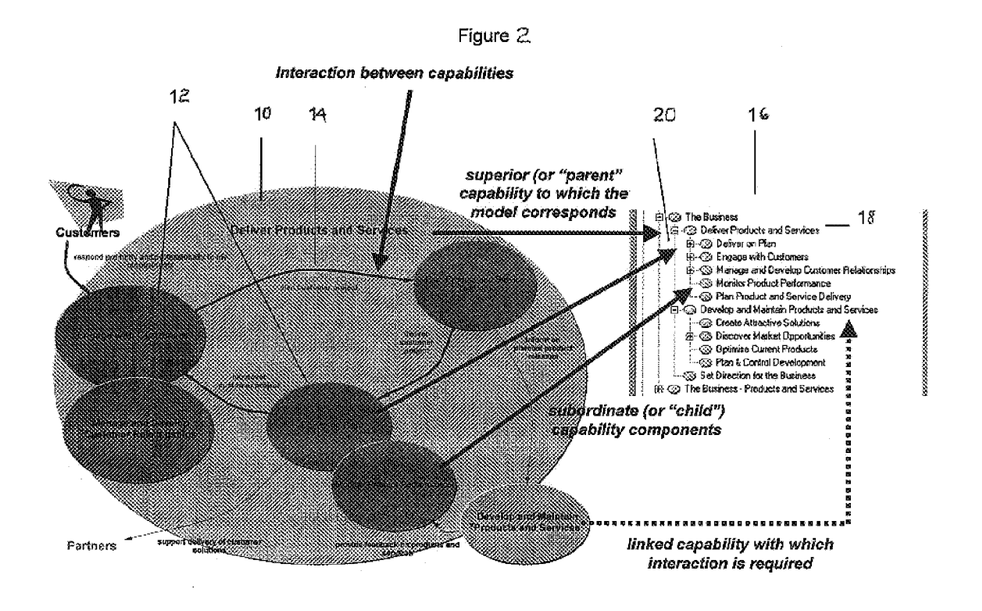
FIG. 2 illustrates a portion of the hierarchical representation of an organization showing alignment with a graphical representation in accordance with the invention.

The second graphical display is a hierarchical structure display 16 of an organization and is illustrated in FIG. 2. This second representation is constructed automatically, in alignment with the graphical model 10. Components added to the model display 10 are automatically added to the hierarchy display 16.

The invention includes a means for generating visual synchronization between the two displays 10,16 as illustrated in FIG. 2. This can be generated in the manner now described.

By selecting a capability 12 in the model display 10, the user causes the processing means (not shown) to automatically regenerate the hierarchical structure display 16 and redisplay the same on a display screen with an indication, such as a highlight, to indicate the selected capability in its contextual location in the hierarchy of the organization.

Conversely, selecting a capability in the hierarchical display 16 automatically causes the processing means to highlight the corresponding graphical representation of the selected capability in the model display 10.

Figure 3:
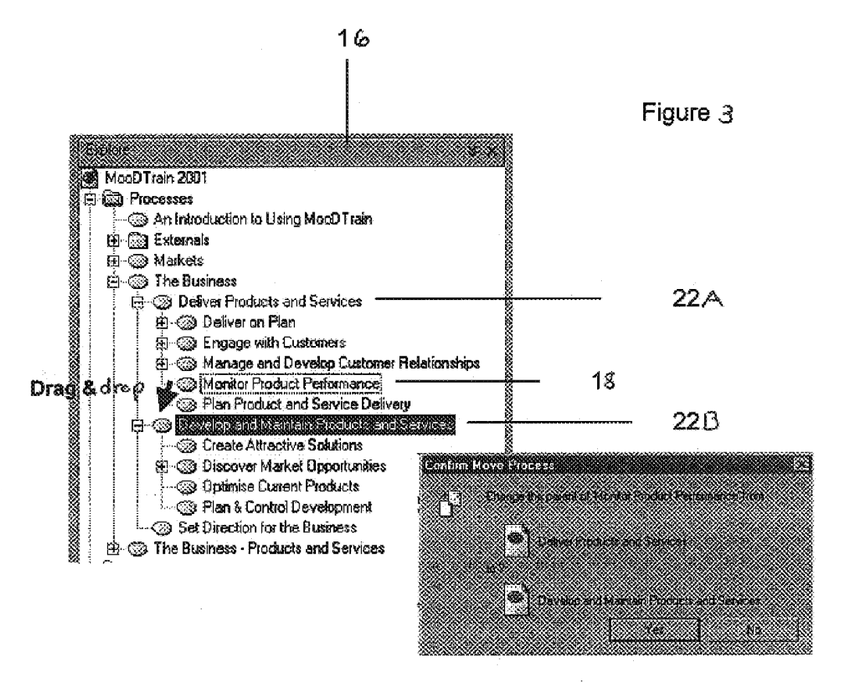
FIG. 3 illustrates a reorganizing of the hierarchical structure by re-locating the component and its subordinates against a different parent.
Figure 4:
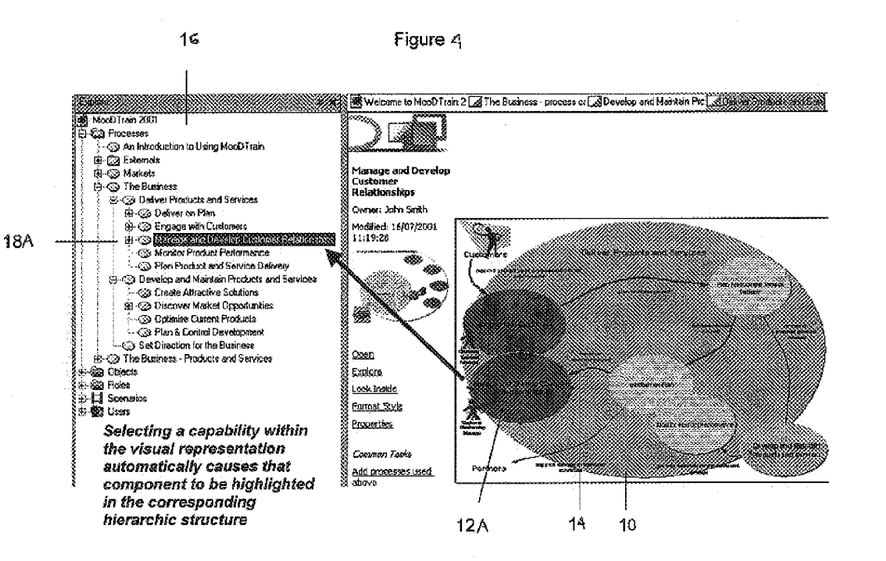
FIG. 4 illustrates a mechanism whereby a component selected within a graphical model causes the hierarchical view to highlight the selected component.
Figure 5:
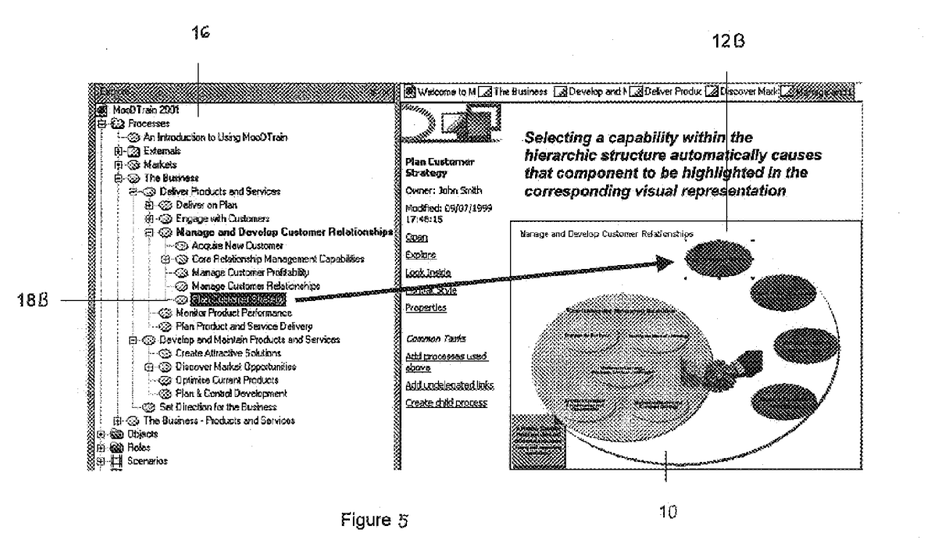
FIG. 5 illustrates a mechanism whereby a component selected within the hierarchic view automatically causes highlighting of the selected component in a graphical model.

In the FIGS. 3–5, an illustration of this process is provided with reference to an organization in the form of a software system for business development and transformation. This organization is illustrated in the displays 10, 16 and provides to the user a flexible automatic exploration mechanism implemented using the graphical user-interface.

Through the invention, the graphical organizational model 10 is created, including capabilities 12 that are structured so as to describe the construction of the organization in terms of its component parts. Interactions 14 between these components are created in terms of origin and target of interactions, and associated information flows. Each component 12 offers the user the ability to directly navigate to its superior or subordinate components, or to any other capability that is linked or which may potentially be linked.

In FIG. 3 there is illustrated the reorganization of the hierarchical structure display 16 by allowing re-location of a capability 18 "Monitor Product Performance" and its subordinates against a new parent or group with the same moving from the group "Deliver Products and Services" 22A to which it was previously allocated to the new parent or group "Develop and Maintain Products" 22B. Concurrent with such a reorganization, the affected graphical model displays 10 are amended by the processing means mechanism, so as to retain consistency between the altered hierarchical structure and model displays.

In FIG. 4 it is illustrated how the contextual analysis of the capability entitled "manage and develop customer relations" 12A which is selected by the user within the graphical model 10 on the right hand side of the Figure can be undertaken by the automatic re generation and redisplay of the hierarchical structure display 16, shown on the left hand side of the display so as to highlight automatically the selected capability 18A.

FIG. 5 illustrates how the reverse process is performed following a user selection of the capability 18B from the hierarchical display 16 leading to the highlighting of the same capability 12B in the graphical model display 10.

Figure 6:
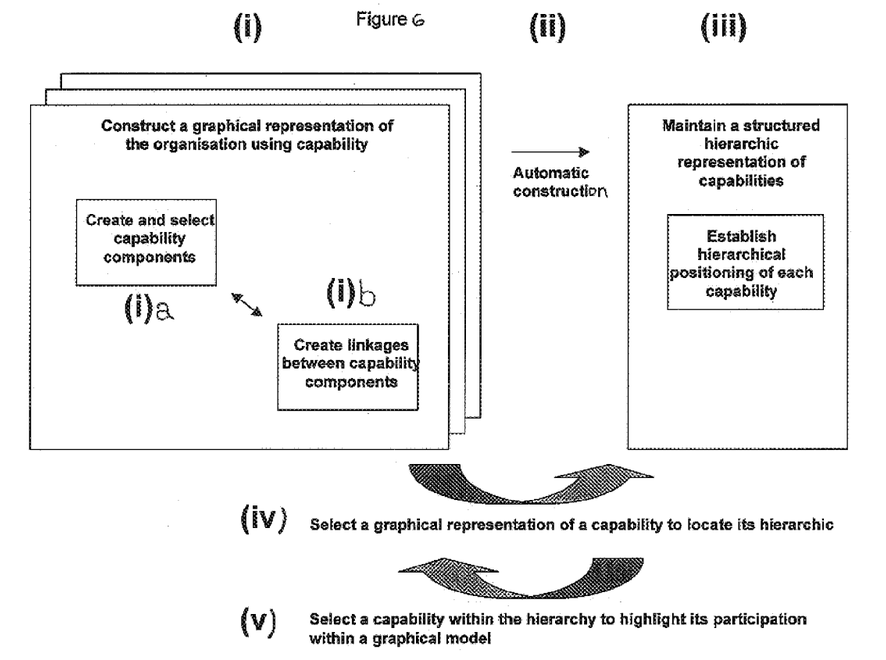
FIG. 6 illustrates in schematic fashion the method followed in generating the invention.

FIG. 6 illustrates the method of the invention in one embodiment with the following steps indicated in the diagram;

i. Construct a collection of graphical model representations 10, of the organization using capability components 12
   (a) create models describing aspects of organizational behavior by combining required capabilities;
   (b) establish directed linkages 14 between capabilities within such models to indicate require interactions.
ii. In response to the creation of a capability, automatically construct and maintain a hierarchical structure representation 16 of the totality of capabilities so as to describe the component structure of the organization. This representation sets each capability 18 in the context of its superiors and subordinates.
iii. Enable reorganization of the hierarchical structure 16 by allowing re-location of a capability 18 and its subordinates against a different parent or group 22 in response to a user selection. Concurrent with such a reorganisation, all affected model displays 10 are amended likewise, so as to retain consistency between views.
iv. Enable contextual analysis of a component selected within a model display 10 by automatically re-displaying the hierarchical structure display 16 so as to highlight automatically the selected component 18.
v. Enable contextual graphical analysis of a capability component 18 within the hierarchical structure display 16 by automatically highlighting within a model display 10 the component 12 selected within the hierarchical structure display 16.

Thus, a visual representation of an organization in terms of a collection of graphical representations, or models, showing how required capabilities interact in order to achieve their required purposes, using directed linkages and resource flows is provided and, complimenting this structure, a hierarchic representation of an organization in terms of capabilities with input/output resource definitions. The user therefore has the ability for any capability within a model, to locate automatically and directly its location within the organization hierarchy and, for any capability within the hierarchy, to locate automatically and directly its corresponding graphical representation within a model.

Typically the apparatus deployed to allow practical implementation of the invention can include a business development and transformation processing system, a software system providing a graphical user interface for the definition and manipulation of the elements and structures described in the method and a general processing mechanism which allows comparison and synchronization between the two graphical representations and the automatic highlighting within either of the representations, of a component selected within the other.

The functionality of the mechanism provides a powerful user experience of exploration, which together with the rest of the apparatus and the method for its usage, give a simpler and more powerful approach to the design and communication of organizations than previously possible.

Thus the present invention provides a method and apparatus which allows a very large number of capabilities, typically inter-related in a complex manner, to be synchronized. The ability to maintain a contextual view of these capabilities is important to develop and communicate to the user a sound understanding of how the organization is structured, and to describe how it operates at various levels of abstraction. Consequently, a combination of synchronized views of the organization is an important contribution to successful organization development.

The invention described in this patent can be used as a central resource within an organizational development and change management methodology and toolset.

The present invention also differs from conventional visual representations in that the components represent general business (and not necessarily software) capabilities. The capabilities are not intended for execution as occurrences within a software system, but are intended primarily for analysis and communication purposes by organization designers and quality managers or other users, although this does not preclude the use of one of the capabilities as a design for a software component. Thirdly, and following from the second, the structuring and navigation mechanisms offer functions not required, and so not provided, by such other methods; e.g. automatic contextual highlighting between alternative views.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method for creating and allowing user interaction with at least one graphical representation of an organization; said method comprising the following steps:

constructing a collection of graphical representations of the organization;

creating a model describing at least one aspect of the behavior of the organization by selecting capabilities of the organization which are required for the said model;

establishing directed linkages between the selected capabilities to indicate required interactions between the capabilities;

displaying the model in a graphical manner;

constructing a hierarchical structure of organization capabilities to illustrate the component structure of the organization setting at least some of the capabilities in the context of their superior and subordinate capabilities;

displaying the hierarchical structure in a graphical manner; and matching and positioning the capabilities included within the said model display relative to the other capabilities in the model with reference to the hierarchical structure display.

2. A method according to claim 1 wherein the capabilities within said model are consistent with the hierarchy display in that for each capability within said model which is defined as a superior capability in said hierarchical structure, all of the required defined subordinate capabilities are included within the model display.

3. A method according to claim 2 including the step of enabling reorganization of the hierarchical structure by allowing user relocation of a component and the subordinate components against a different parent or group in the structure.

4. A method according to claim 3 wherein the reorganization involves a component that has been moved being removed from the model of its previous parent or group and inserted into the model describing its new parent or group.

5. A method according to claim 4 wherein a link is generated to indicate all of the graphical representations of the organization which are affected by the reorganization and all of the identified graphical representations are amended so as to maintain consistency between the graphical representations.

6. A method according to claim 1 wherein a contextual analysis of a component selected by the user from the graphical model is performed by the indication in the hierarchical structure display of the user selected component and the position of the same in the hierarchical representation.

7. A method according to claim 6 wherein the contextual graphical analysis of the component is achieved within the hierarchical display by highlighting the selected component.

8. A method according to claim 1 wherein in that the contextual synchronization by the user between the graphical representation of a selected component and its hierarchical location is achieved by means of a mechanism which regenerates the hierarchical structure display to indicate to the user the position of the selected component following the selection of the component from the graphical model display.

9. A method according to claim 8 wherein the contextual synchronization is achieved between the selected component within said hierarchical structure display and the graphical model display by means of a mechanism that generates the model display indicating the selected component or components.

10. An apparatus for navigation through graphical representations of a model of at least part of an organization and the hierarchical structure of the organization; said apparatus comprising:

a processing means for displaying both the hierarchical structure and model of the organization on a display screen connected to processing means, said representations each including details representing organization parents or groups, components of the organization and elements of the components;

processing means allowing the user selection to display on a display screen at least one from the group consisting of the hierarchical structure or organizational model displays and to select from said displays from the group consisting of a parent, component or element; and a mechanism is provided which, upon selection of a component by the user from one of the organizational model or hierarchic structure displays, allows the generation of a display of the other of the organizational model or hierarchical representation with the user selected component indicated on the same.

* * * * *